United States Patent
Logigan et al.

(10) Patent No.: US 8,042,169 B2
(45) Date of Patent: Oct. 18, 2011

(54) METHOD FOR PROVIDING REMOTE MANAGEMENT OF COMPUTER SYSTEMS

(75) Inventors: Mircea Logigan, Ottawa (CA); Peter Rochon, Ottawa (CA)

(73) Assignee: LPI Level Platforms, Ltd., Ontario (CA)

( * ) Notice: Subject to any disclaimer, the term of this patent is extended or adjusted under 35 U.S.C. 154(b) by 1301 days.

(21) Appl. No.: 11/550,259

(22) Filed: Oct. 17, 2006

(65) Prior Publication Data

US 2007/0124814 A1 May 31, 2007

Related U.S. Application Data

(60) Provisional application No. 60/731,498, filed on Oct. 31, 2005.

(51) Int. Cl.
H04L 29/06 (2006.01)
G06F 7/04 (2006.01)
G06F 9/00 (2006.01)
G06F 11/00 (2006.01)

(52) U.S. Cl. ................. 726/12; 726/6; 726/25; 713/153

(58) Field of Classification Search .................. 713/153; 726/6, 12, 25

See application file for complete search history.

(56) References Cited

U.S. PATENT DOCUMENTS

| 5,198,806 | A | | 3/1993 | Lord | |
|---|---|---|---|---|---|
| 5,715,823 | A | | 2/1998 | Wood | |
| 5,857,074 | A | | 1/1999 | Johnson | |
| 5,864,683 | A | | 1/1999 | Boebert | |
| 5,958,007 | A | | 9/1999 | Lee | |
| 5,996,010 | A | * | 11/1999 | Leong et al. | 709/223 |
| 6,154,843 | A | | 11/2000 | Hart | |
| 6,480,901 | B1 | * | 11/2002 | Weber et al. | 709/246 |
| 7,051,105 | B2 | * | 5/2006 | Lauzon et al. | 709/227 |
| 7,516,450 | B2 | * | 4/2009 | Ogura | 717/168 |
| 7,620,707 | B1 | * | 11/2009 | Sutherland et al. | 709/223 |
| 2003/0018753 | A1 | | 1/2003 | Seki | |
| 2003/0233400 | A1 | * | 12/2003 | Pinal | 709/201 |
| 2004/0059647 | A1 | * | 3/2004 | Hudson | 705/28 |
| 2004/0093383 | A1 | * | 5/2004 | Huang et al. | 709/206 |
| 2005/0114665 | A1 | * | 5/2005 | Shim et al. | 713/171 |
| 2005/0177637 | A1 | * | 8/2005 | Heron et al. | 709/227 |

* cited by examiner

Primary Examiner — Mohammad W Reza

(74) Attorney, Agent, or Firm — Andrew M. Calderon; Roberts Mlotkowski Safran & Cole, P.C.

(57) ABSTRACT

A method for managing the computer systems of a private network from a remote physical location in a manner that does not require the installation of agents on the computer systems of the private network, or the reconfiguration of the firewall of the private network to permit access into the private network.

18 Claims, 4 Drawing Sheets

METHOD FOR PROVIDING REMOTE MANAGEMENT OF COMPUTER SYSTEMS

CROSS-REFERENCE TO RELATED APPLICATIONS

The present application claims the benefit of U.S. Provisional Patent Application Ser. No. 60/731,498 filed on Oct. 31, 2005, the contents of which are hereby incorporated by reference in its entirety.

STATEMENT REGARDING FEDERALLY SPONSORED RESEARCH OR DEVELOPMENT

Not applicable.

REFERENCE TO A "SEQUENCE LISTING"

Not applicable.

FIELD OF INVENTION

The invention relates to the management of computer systems and, in particular, it relates to a method for providing secure and efficient management of computers of a private network from a remote physical location through a computer communications network.

BACKGROUND

Many organizations have several computer systems connected to a private network. These computer systems could be geographically co-located (for example, a private network connecting several computers located within one office) or geographically separated (for example, a private network connecting several computers located at different, remote offices).

Managing the computer systems of a private network from a remote physical location has been achieved. However, achieving greater security and overall efficiencies in managing these computer systems from a remote site is a continuing challenge.

Existing methods for managing computer systems from remote physical locations have various inefficiencies associated with them. Two main sources of inefficiency are:
1. Existing methods for managing computer systems from a remote site are agent-based methods: on each computer system that is to be controlled, a software component (an "agent") needs to be installed to enable remote access. Deploying or installing agents on all of the computer systems of the private network translates directly into significant monetary consequences, both in software costs and labor. Dispatching a technical person to install and configure these agents may even be involved, which would compound the inefficiency of agent-based methods.
2. In order to protect the computer systems of private networks, firewalls are usually used to allow only certain access to the private networks. Since the methods of the prior art require that the remote control session be initiated from outside the firewall of the private network, the firewalls should be reconfigured to allow the remote management packets through certain ports into the private network. This reconfiguration represents another source of inefficiency.

Therefore, it is desirable to have a method for managing the computer systems of a private network from a remote physical location in a manner that does not require the installation of agents on the computer systems of the private network, or the reconfiguration of the firewalls of the private networks to permit access into the private networks.

The present invention responds to the aforementioned desires.

SUMMARY OF THE INVENTION

To overcome the limitations/deficiencies of the prior art described above, and to overcome other limitations that will become apparent upon reading and understanding the present specification, the present invention accordingly provides a method for providing remote management of selected computer system(s) on a private network from a remote computer outside the private network, wherein the private network and the remote computer are connected through a computer communications network.

The method comprises the following steps:
1. A Proxy Server, outside the private network and connected to the computer communications network, receives and maintains a connection request to selected computer system(s) from the remote computer. (This could be done by utilizing a Web page at the remote computer's end.)
2. An Onsite Manager on the private network prompts the Proxy Server for the connection request. The Onsite Manager may be set to prompt the Proxy Server at predefined time intervals.
3. The Proxy Server, once prompted, sends the connection request to the Onsite Manager.
4. The Onsite Manager, after receiving the connection request, sends an instruction to the selected computer system(s) to initiate a remote management session to the Proxy Server.
5. The selected computer system(s), after receiving the instruction, initiate(s) the remote management session to the Proxy Server using a predefined port.
6. The Proxy Server bridges the remote management session between the selected computer system(s) and the remote computer.

An advantage of the present invention is to provide remote management of computer systems located on an organization's internal network, wherein beyond the installation of the Onsite Manager on the private network, no configuration is required—no need for installing agents on all of the computer systems of the internal network Another advantage of the present invention is to provide a high level of security by allowing only outbound connections over the firewall protecting the internal network. The remote management session is initiated from inside the firewall after receiving a request from the Onsite Manager. Since no inbound connections (for the purpose of remote management) are permitted, the invention does not require any special firewall reconfiguration on the private network end.

A further advantage of the invention is that it allows for much quicker deployment of remote control sessions across many computers inside a private network.

Still, an additional advantage of the invention is that it allows a remote session to be initiated from a simple-to-use Web Dashboard.

Other advantages will suggest themselves to those skilled in the art.

BRIEF DESCRIPTION OF THE INVENTION

The invention, its organization, construction and operation will be best understood by reference to the following description taken in conjunction with the accompanying drawings, in which.

DETAILED DESCRIPTION OF THE INVENTION

It is to be understood that the following description shows only the preferred embodiment of the present invention and discusses the method associated with said embodiment. It is expected that numerous variants will be obvious to those skilled in the art without departing from the spirit of the invention. Moreover, well-known elements, devices, process steps and the like are not set forth in detail in order to avoid obscuring the present invention. The appended claims, properly construed, form the only limitation upon the scope of the invention.

It will be generally understood that the term "manage" as used in the present description and claims in reference to the "management" of computer systems should be given a broad meaning, which includes (but is not limited to) "monitor" and "control." Hence, "managing the computer systems of a private network" should include "monitoring the computer systems of a private network," and "controlling the computer systems of a private network."

Figure 1:
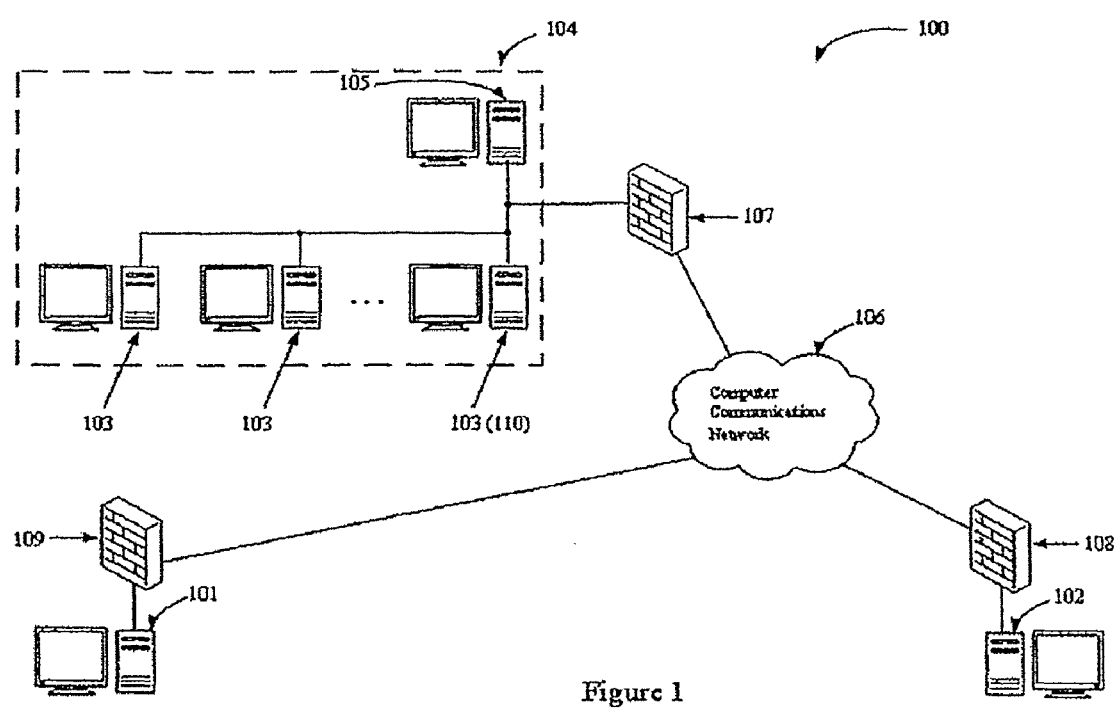
FIG. 1 is a system-level view of the preferred embodiment of the present invention.

Referring to FIG. 1, there is illustrated in a system-level view and in accordance with the preferred embodiment of the present invention, a system 100 for providing secure remote management of computer systems 103 located inside a private network 104 from a remote computer 101 (also referred to as "Network Administrator") utilizing a Proxy Server 102.

The private network 104 comprises an Onsite Manager 105, and a plurality of computer systems 103. Each of the computer systems 103 may or may not be a server serving a plurality of geographically co-located or geographically separated computers (not shown).

The private network 104, the Proxy Server 102, and the remote computer 101 each has its own firewall—a network firewall 107, a proxy firewall 108, and an administrator firewall 109, respectively. The network firewall 107 is configured not to permit inbound connections for the purpose of remote management, but to allow only outbound connections (such as the connection established by the Onsite Manager to the Proxy Server 102, and the connection established by the selected computer system to the Proxy Server 205, as will be explained below).

The Network Administrator 101, the Proxy Server 102, and the private network 104 are connected through a conventional Computer Communications Network 106 (CCN). The CCN 106 may be (but is not limited to) a wide area network (WAN), or a larger enterprise network such as the Internet.

Figure 4:
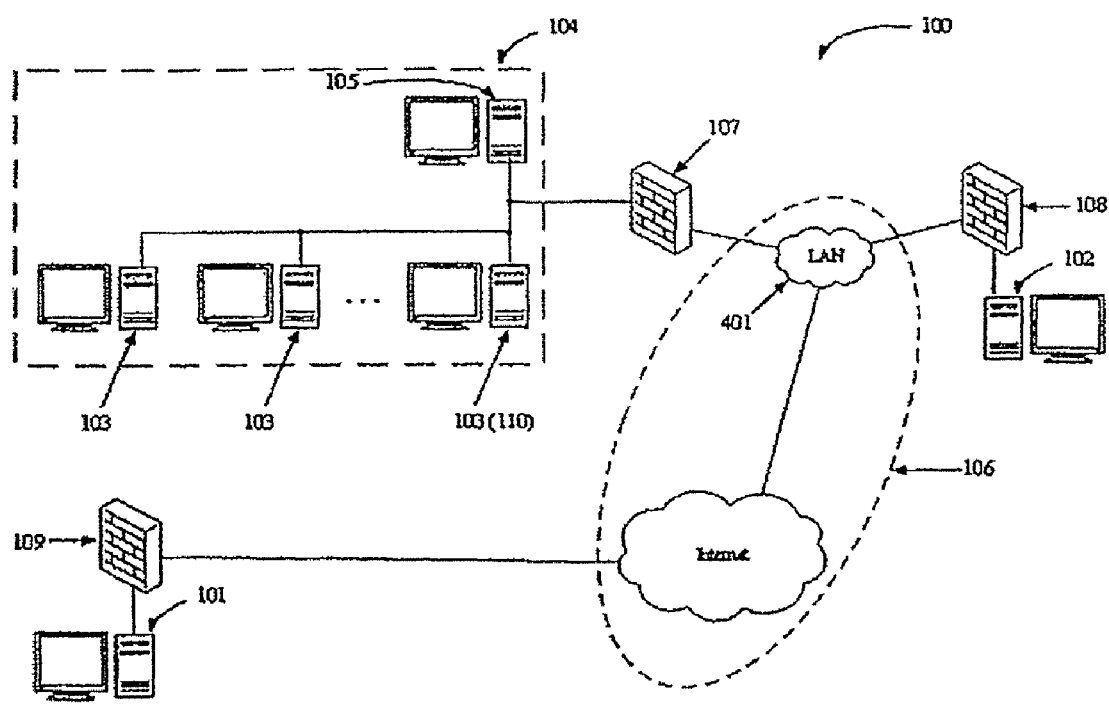
FIG. 4 is a system-level view of another embodiment of the present invention.

Although the CCN 106 has been shown as a single entity in FIG. 1, it should be understood that the CCN 106 may be a conglomeration of computer networks (see FIG. 4). The present invention therefore is not limited to any specific CCN structure or to the current structure or form of the Internet, which is constantly evolving and changing.

Also, in FIG. 1, the Network Administrator 101, the Proxy Server 102, and the private network 104 are shown as being connected (via the firewalls) directly to the CCN 106; the invention, however, may be practiced with any suitable connection of these elements to the CCN 106, such as through an intermediate Internet access provider where the CCN 106 is the Internet.

Further, the Proxy Server 102 may be located close to the private network 104 and communicate with it through a local area network 401 (LAN), as shown in FIG. 4; or the Proxy Server 102 may be located at a site remote from the private network 104 and communicate with it through a wide area network or even the Internet.

Communications over the CCN 106 are achieved by using conventional network protocols suitable for the type of CCN 106 being used. For example, where the CCN 106 is the Internet, the HyperText Transport Protocol (http) may be used, packetized using a protocol such as the Transmission Control Protocol over Internet Protocol (TCP/IP).

The Onsite Manager 105, the Proxy Server 102, and the Network Administrator 101 are not each limited to a single computer as shown in FIG. 1, but each may instead comprise a network of computers (not shown), such as a local area network.

Figure 2:
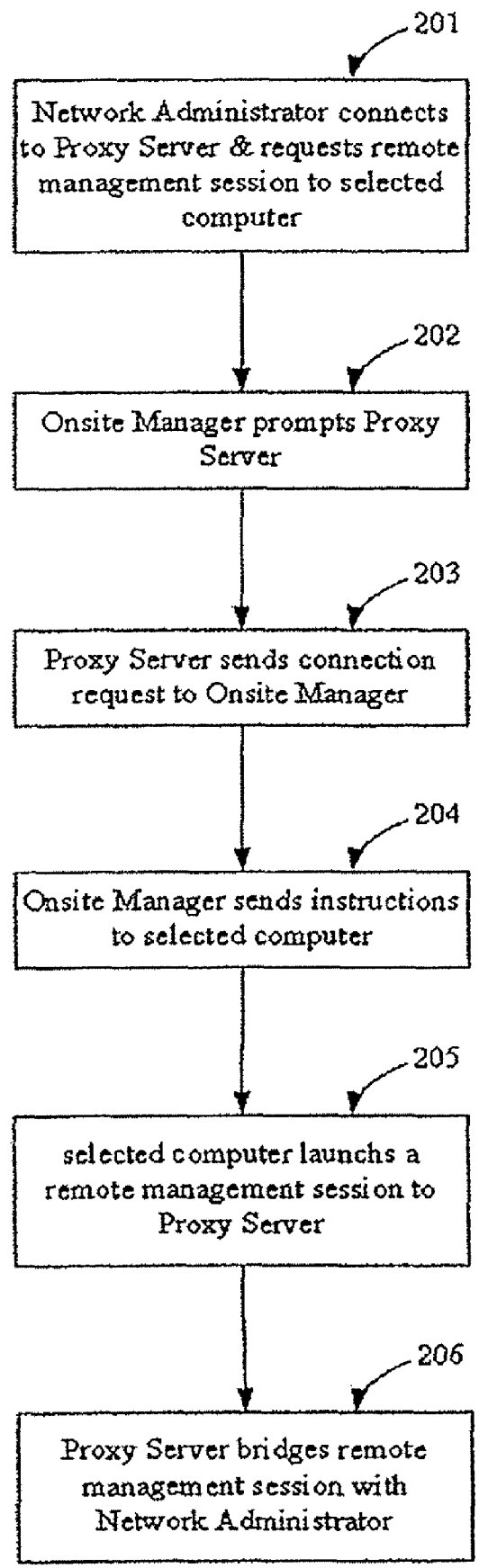
FIG. 2 is a flow chart illustrating the steps of the method in accordance with the present invention.
Figure 3:
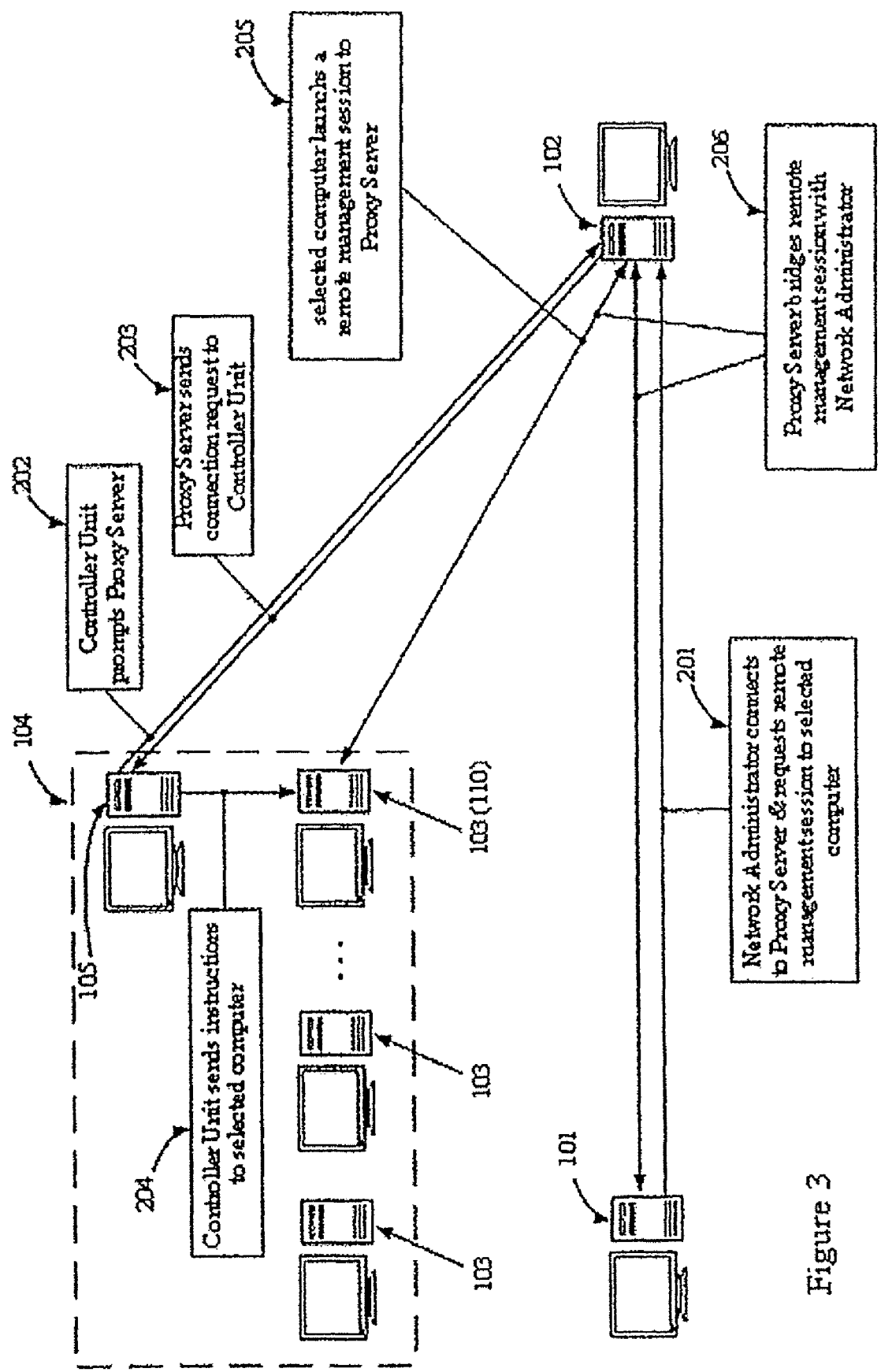
FIG. 3 illustrates the steps of the flowchart of FIG. 2 according to the embodiment of FIG. 1.

Referring now to FIGS. 2 and 3, which together illustrate the operation of the present invention according to the embodiment of FIG. 1 (in FIG. 3, the firewalls 107, 108, 109 have been removed for better clarity), the Network Administrator 101 first connects to the Proxy Server 102 and requests a remote management session 201 to a selected computer system 110 within the private network. This could be done by utilizing a Web page, where the user would visit (log on) a Proxy Server 102 Web portal and requests a remote management session to a computer system within the private network 104 by clicking on a hyperlink.

The Proxy Server 102, prompted 202 by the Onsite Manager 105, then sends a command (a connection request 203) via the CCN to the Onsite Manager 105. The Onsite Manager 105 may be programmed to prompt the Proxy Server 102 at predetermined time intervals. Since the network firewall 107 is configured not to permit inbound connections for the purpose of remote management, the Proxy Server 102 can send the connection request only when it is prompted to do so by the Onsite Manager 105.

Once the Onsite Manager 105 receives the command, it sends instructions 204 (possibly, in the form of a Windows Management Instrumentation (WMI) command) to the selected computer system 110 to launch a remote management session from inside the network directly to the Proxy Server 102. The connection is attained 205 usually using a predefined port.

The Proxy Server 102 then bridges 206 the remote management session with the Network Administrator 101 allowing the Network Administrator 101 to have direct remote management of the selected computer system 110.

Other embodiments and uses of the invention will be apparent to those skilled in the art from consideration of the specification and practice of the invention disclosed herein. The specification and examples should be considered exemplary only and do not limit the intended scope of the invention.

What is claimed is:

1. A method for providing remote management of at least one computer system on a private network from a remote computer outside said private network, wherein said private network and said remote computer are connected through a computer communications network, said method comprising the steps of:

a. a Proxy Server, outside said private network and connected to said computer communications network, receiving and maintaining a connection request from said remote computer;

b. an Onsite Manager on said private network prompting said Proxy Server for said connection request;

c. said Proxy Server, once prompted, sending said connection request to said Onsite Manager;

d. said Onsite Manager, after receiving said connection request, sending an instruction to said at least one computer system to initiate a remote management session to said Proxy Server;

e. said at least one computer system, after receiving said instruction, initiating said remote management session to said Proxy Server;

f. said Proxy Server bridging said remote management session between said at least one computer system and said remote computer.

2. The method of claim 1, wherein said Onsite Manager is configured to prompt said Proxy Server for said connection request at predetermined time intervals.

3. The method of claim 1, wherein said remote management session is initiated by said at least one computer system to said Proxy Server using a predefined port.

4. The method of claim 1, wherein said private network is behind a network firewall.

5. The method of claim 4, wherein said network firewall is configured to prohibit inbound connection requests to said Onsite Manager or said at least one computer system.

6. The method of claim 1, wherein said Proxy Server is behind a proxy firewall.

7. The method of claim 1, wherein said computer communications network is a Wide Area Network (WAN).

8. The method of claim 1, wherein said computer communications network is an Internet.

9. The method of claim 8, wherein a hyperlink on a Web page is utilized at said remote computer for sending said connection request from said remote computer to said Proxy Server.

10. The method of claim 8, wherein said Proxy Server is located at a site remote from said Onsite Manager and said connection request is sent from said Proxy Server to said Onsite Manager through said Internet.

11. The method of claim 10, wherein said Proxy Server sends said connection request using HyperText Transfer Protocol (http).

12. The method of claim 10, wherein said Onsite Manager receives said connection request using HyperText Transfer Protocol (http).

13. The method of claim 8, wherein said Onsite Manager, said Proxy Server, and said remote computer communicate by using Transmission Control Protocol over Internet Protocol (TCP/IP).

14. The method of claim 1, wherein said Onsite Manager sends said instruction using Windows Management Instrumentation protocol (WMI protocol).

15. The method of claim 7, wherein:
the WAN is between the Proxy Server and the remote computer; and
the WAN is between the Proxy Server and the Onsite Manager.

16. The method of claim 7, wherein:
the Proxy Server and the remote computer communicate via the WAN;
the Proxy Server and the Onsite Manager communicate via the WAN.

17. The method of claim 1, wherein the bridging said remote management session between said at least one computer system and said remote computer at least one computer system is performed by the Proxy Server independent of the Onsite Manager.

18. The method of claim 1, wherein the Proxy Server communicates directly with the at least one computer system during the remote management session.

* * * * *